(12) United States Patent
Hashimoto

(10) Patent No.: US 8,038,882 B2
(45) Date of Patent: Oct. 18, 2011

(54) INTERMITTENT GAS FLOW APPARATUS AND MEMBRANE SEPARATION APPARATUS

(75) Inventor: Tomotaka Hashimoto, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 414 days.

(21) Appl. No.: 12/350,595

(22) Filed: Jan. 8, 2009

(65) Prior Publication Data

US 2009/0194477 A1    Aug. 6, 2009

(30) Foreign Application Priority Data

Jan. 11, 2008    (JP) ................ 2008-004425

(51) Int. Cl.
*B01D 65/02*    (2006.01)
*B01D 63/00*    (2006.01)
*C02F 1/44*    (2006.01)
*F16K 24/00*    (2006.01)

(52) U.S. Cl. .............. 210/636; 210/321.69; 137/583

(58) Field of Classification Search ........... 210/636, 210/321.69; 137/583
See application file for complete search history.

(56) References Cited

U.S. PATENT DOCUMENTS

| | | | |
|---|---|---|---|
| 6,245,239 B1 | 6/2001 | Cote et al. | |
| 7,017,557 B2 * | 3/2006 | Rumpf ............... | 123/509 |
| 2005/0006308 A1 * | 1/2005 | Cote et al. ............ | 210/636 |

FOREIGN PATENT DOCUMENTS

| | | |
|---|---|---|
| JP | 7-185270 | 7/1995 |
| JP | 9038470 A * | 2/1997 |
| JP | 2004-322100 | 11/2004 |
| WO | WO2004050221 A1 * | 6/2004 |
| WO | 2008/153818 A1 | 12/2008 |

OTHER PUBLICATIONS

Chinese Office Action issued with respect to Chinese Patent App. No. 200910001522.2, dated Mar. 21, 2011.
English language Abstract of JP 7-185270.
English language Abstract of JP 2004-322100.

* cited by examiner

*Primary Examiner* — Nam Nguyen
*Assistant Examiner* — Denise R Anderson
(74) *Attorney, Agent, or Firm* — Greenblum & Bernstein, P.L.C.

(57) ABSTRACT

Intermittent gas flow and membrane separation apparatus and methods of use including an internal gas chamber including an upper wall; at least one inlet for supplying gas to the internal gas chamber; a column pipe that extends above the upper wall of the internal gas chamber, the column pipe including a lower end portion including a lower end portion opening in the internal gas chamber, the column pipe linking the internal gas chamber to an area external to the internal gas chamber for fluid flow between the internal gas chamber and the external area; an auxiliary pipe including one end portion connected to the column pipe for fluid flow between the auxiliary pipe and the column pipe, and another end portion branched off from the column pipe, the another end portion including an opening located in the internal gas chamber at a position higher than the lower end portion opening of the column pipe by a predetermined height; and an auxiliary pipe external tubular member including a closed end, the auxiliary pipe external tubular member surrounding the another end portion of the auxiliary pipe with the closed end being positioned below the opening in the another end portion of the auxiliary pipe, and spaced from the another end portion by a predetermined distance permitting fluid flow into the space between the wall of the tubular member and the auxiliary pipe.

29 Claims, 8 Drawing Sheets

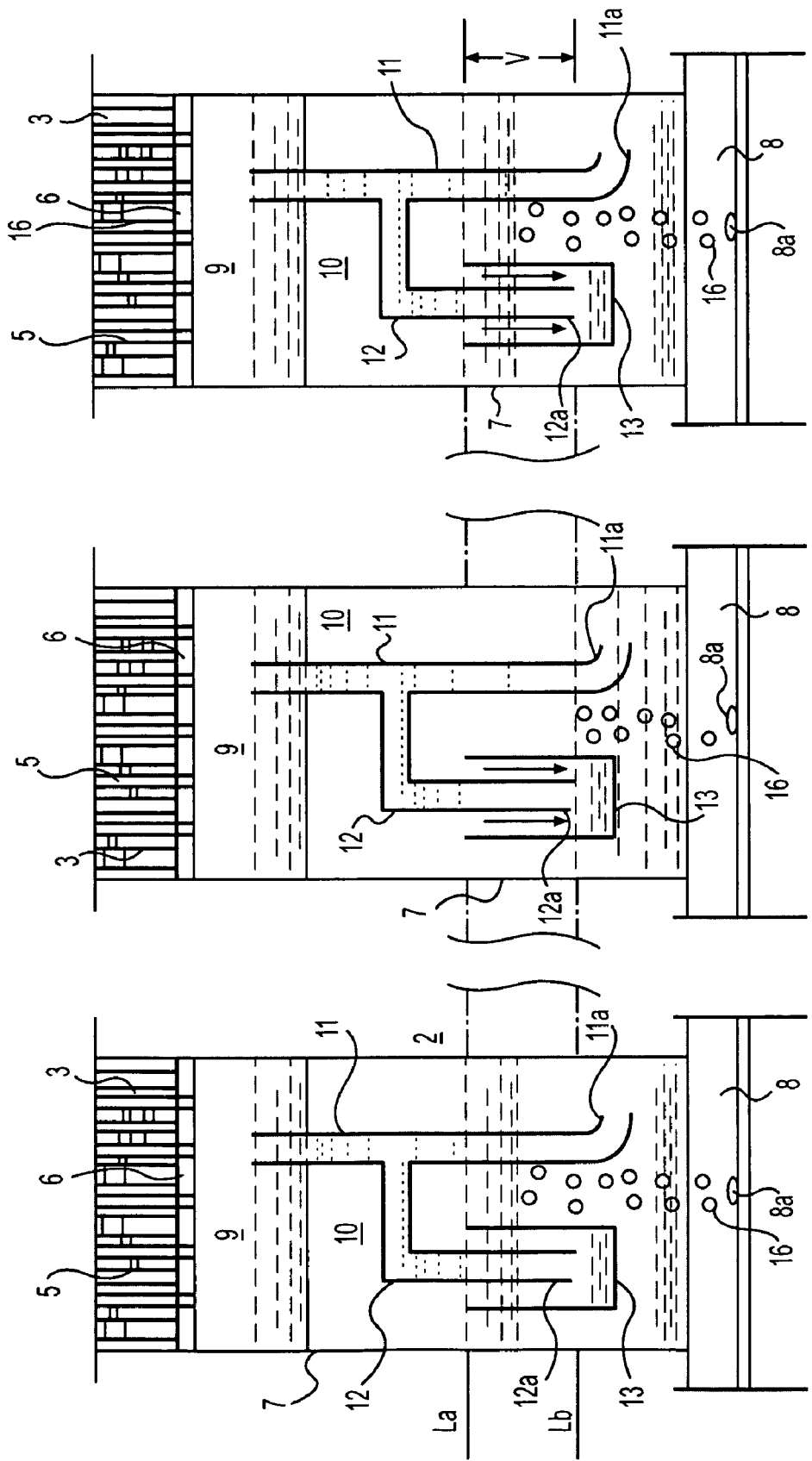

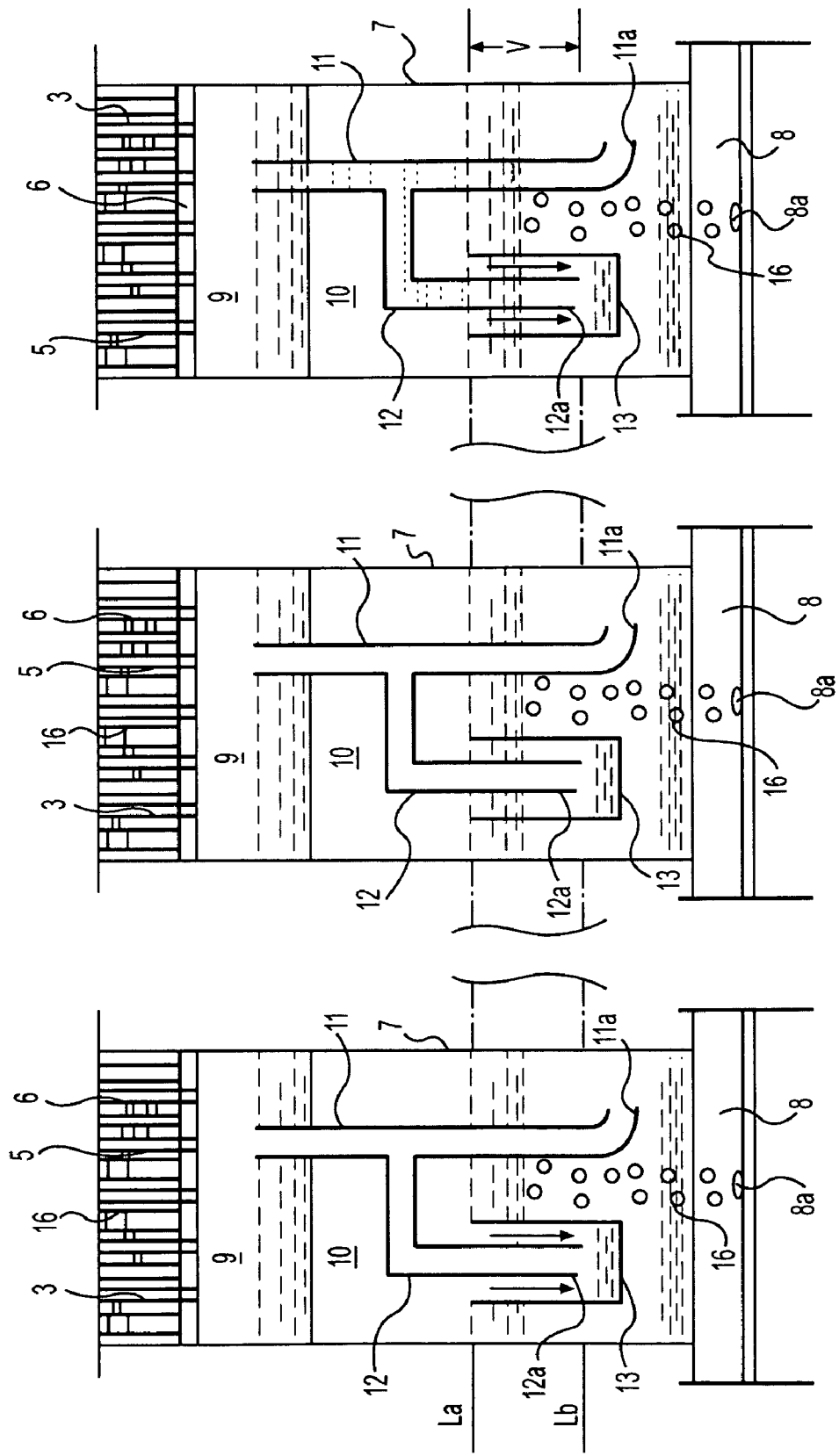

INTERMITTENT GAS FLOW APPARATUS AND MEMBRANE SEPARATION APPARATUS

CROSS-REFERENCE TO RELATED APPLICATIONS

The present application claims priority under 35 U.S.C. §119 of Japanese Application No. 2008-004425, filed Jan. 11, 2008, the disclosure of which is expressly incorporated by reference herein in its entirety.

BACKGROUND OF THE INVENTION

1. Field of the Invention

The present invention relates to intermittent gas flow units useful for providing intermittent flow of gas, which units are useful in any environment wherein an intermittent flow of gas is desired, for example, with membrane separation units to provide cleaning of the membrane separation units. The present invention also relates to membrane separation units, such as membrane separation units including a plurality of membrane modules, such as hollow fiber membrane modules. The present invention also relates to filtering and separating liquid in a treatment tank by performing suction through membranes, such as through hollow fiber membranes submerged in the liquid in the treatment tank.

2. Discussion of Background Information

When food wastewater, sewage, or sludge, is decomposed, for example, a large amount of aeration is required in a treatment tank, so that bacteria can breath in the treatment tank. Since a direct impact of aeration for bacteria may damage hollow fiber membranes, the hollow fiber membranes are protected from aeration. Meanwhile, the liquid in the treatment tank is pumped through hollow fiber membranes, and thereby liquid that has permeated the membranes is filtered and separated, and obtained as filtered and treated water. Since suspended matters deposited on an external side of the hollow fiber membranes reduce filtration performance, an appropriate amount of aeration is provided to the external side of the hollow fiber membranes, so as to remove the suspended matters deposited on the external side of the hollow fiber membranes.

A submerged membrane apparatus is disclosed in Japanese Patent Laid-Open Publication No. H7-185270, the disclosure of which is incorporated by reference herein in its entirety, having a membrane unit submerged in liquid in a treatment tank and providing filtered and treated water that has permeated the membrane. The submerged membrane apparatus is provided with an aerator generating coarse bubbles and an aerator generating fine bubbles below the membrane unit in the treatment tank.

When continuous aeration is performed, however, electricity expenses are incurred to constantly supply air, and life of hollow fiber membranes is shortened due to damage from being continuously aerated. Although Japanese Patent Laid-Open Publication No. H7-185270 does not describe specific intermittent operations of the aerators, a separate control system is generally required to control intermittent operation. Such a separate control system leads to disadvantages, including a complex structure and cost increase. For example, intermittent supply of air controlled by valves includes the use of large pipes and high pump costs with the valves being hard to maintain.

Accordingly, there is a need in the art for intermittent supply of gas that includes a simple device that is capable of providing a high volume of gas, preferably in the form of bubbles, preferably from a continuous flow of gas.

SUMMARY OF THE INVENTION

The present invention addresses disadvantages of the prior art, including providing a simpler structure and operation along with reduced capital and/or operating costs.

The present invention provides a membrane separation unit capable of intermittent aeration operation with a simple structure, without requiring a special control system.

The present invention provides an intermittent gas flow apparatus comprising an internal gas chamber including an upper wall; at least one inlet for supplying gas to the internal gas chamber; a column pipe that extends above the upper wall of the internal gas chamber, the column pipe including a lower end portion including a lower end portion opening in the internal gas chamber, the column pipe linking the internal gas chamber to an area external to the internal gas chamber for fluid flow between the internal gas chamber and the external area; an auxiliary pipe including one end portion connected to the column pipe for fluid flow between the auxiliary pipe and the column pipe, and another end portion branched off from the column pipe, the another end portion including an opening located in the internal gas chamber at a position higher than the lower end portion opening of the column pipe by a predetermined height; and an auxiliary pipe external tubular member including a closed end, the auxiliary pipe external tubular member surrounding the another end portion of the auxiliary pipe with the closed end being positioned below the opening in the another end portion of the auxiliary pipe, and spaced from the another end portion by a predetermined distance permitting fluid flow into the space between the wall of the tubular member and the auxiliary pipe.

The present invention also provides a membrane separation apparatus for filtering and separating liquid in a treatment tank by pumping the liquid through a filtration membrane submerged in the liquid in the treatment tank, the membrane separation apparatus comprising a treatment tank; a filtration membrane in the treatment tank; an intermittent gas flow apparatus positioned in the treatment tank below the filtration membrane, the intermittent gas flow apparatus comprising an internal gas chamber including an upper wall; at least one inlet for supplying gas to the internal gas chamber; a column pipe that extends above the upper wall of the internal gas chamber, the column pipe including a lower end portion including a lower end portion opening in the internal gas chamber, the column pipe linking the internal gas chamber to an area external to the internal gas chamber for fluid flow between the internal gas chamber and the external area; an auxiliary pipe including one end portion connected to the column pipe for fluid flow between the auxiliary pipe and the column pipe, and another end portion branched off from the column pipe, the another end portion including an opening located in the internal gas chamber at a position higher than the lower end portion opening of the column pipe by a predetermined height; and an auxiliary pipe external tubular member including a closed end, the auxiliary pipe external tubular member surrounding the another end portion of the auxiliary pipe with the closed end being positioned below the opening in the another end portion of the auxiliary pipe, and spaced from the another end portion by a predetermined distance permitting fluid flow into the space between the wall of the tubular member and the auxiliary pipe.

The present invention also provides a method of supplying intermittent flow of air for cleaning of a filtration membrane submerged in liquid in a treatment tank, comprising positioning an intermittent gas flow apparatus in the treatment tank below the filtration membrane, the intermittent gas flow apparatus comprising an internal gas chamber including an upper wall; at least one inlet for supplying gas to the internal gas chamber; a column pipe that extends above the upper wall of the internal gas chamber, the column pipe including a lower end portion including a lower end portion opening in the internal gas chamber, the column pipe linking the internal gas chamber to an area external to the internal gas chamber for fluid flow between the internal gas chamber and the external area; an auxiliary pipe including one end portion connected to the column pipe for fluid flow between the auxiliary pipe and the column pipe, and another end portion branched off from the column pipe, the another end portion including an opening located in the internal gas chamber at a position higher than the lower end portion opening of the column pipe by a predetermined height; and an auxiliary pipe external tubular member including a closed end, the auxiliary pipe external tubular member surrounding the another end portion of the auxiliary pipe with the closed end being positioned below the opening in the another end portion of the auxiliary pipe, and spaced from the another end portion by a predetermined distance permitting fluid flow into the space between the wall of the tubular member and the auxiliary pipe; and continuously flowing air through the intermittent gas flow apparatus to provide intermittent flow of air to the filtration membrane from the intermittent gas flow apparatus.

The column pipe can extend through the upper wall.

There can be provided an upwardly extending upper side wall above the upper wall.

The upper side wall can extend around an entire periphery of the upper wall.

An opening can be provided in the upper side wall.

The at least one inlet can include an inlet configured to supply gas at a lower portion of the interior gas chamber.

The at least one inlet can include an inlet configured to supply gas at an upper portion of the interior gas chamber.

The at least one inlet can include an inlet configured to supply gas at a lower portion of the interior gas chamber, and an inlet configured to supply gas at an upper portion of the interior gas chamber.

A filter can be included in the space between the wall of the tubular member and the auxiliary pipe.

The internal gas chamber can include a side wall including an opening therein, and further including a filter in the opening in the side wall.

There can be provided an insertion length adjuster for adjusting an insertion length of the auxiliary pipe in the tubular member.

There can be provided a gas entry preventer preventing gas from the at least one inlet from directly entering the lower end portion opening of the column pipe.

The filtration membrane can comprise a plurality of filtration membranes.

The plurality of filtration membranes can comprise bundles of hollow fiber membranes.

The intermittent gas flow apparatus can be positioned directly below bundles of hollow fiber membranes.

The intermittent gas flow apparatus can be offset with respect to bundles of hollow fiber membranes.

The intermittent gas flow apparatus can be attached to the bundle of hollow fiber membranes.

The column pipe can extend through the upper wall.

The upper side wall can be attached to the bundle of hollow fiber membranes.

The upper side wall and the bundle of hollow fiber membranes can form an upper chamber.

The intermittent gas flow apparatus can support the bundle of hollow fiber membranes.

The upper side wall can be attached to the bundle of hollow fiber membranes so that the intermittent gas flow apparatus supports the bundle of hollow fiber membranes; the upper side wall and the bundle of hollow fiber membranes can form an upper chamber; the upper wall can form a partition between the upper chamber and the interior gas chamber; the column pipe can extend through the upper wall linking the first internal gas chamber and the upper chamber; the auxiliary pipe can be linked to the column pipe in the upper chamber; and the bundle of hollow fiber membranes can include a portion including openings for aeration positioned at predetermined positions to permit gas passage around the hollow fiber membranes.

An aeration pipe can be adapted to continuously supply gas to the internal gas chamber.

The present invention described above enables intermittent aeration operation with a simple construction, without requiring a complex electric control system, thereby extending life of filtration membranes.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIGS. 3A to 3F illustrate intermittent aeration operations of the membrane separation unit according to the first embodiment of the present invention;

DETAILED DESCRIPTION OF PREFERRED EMBODIMENTS

Figure 1:
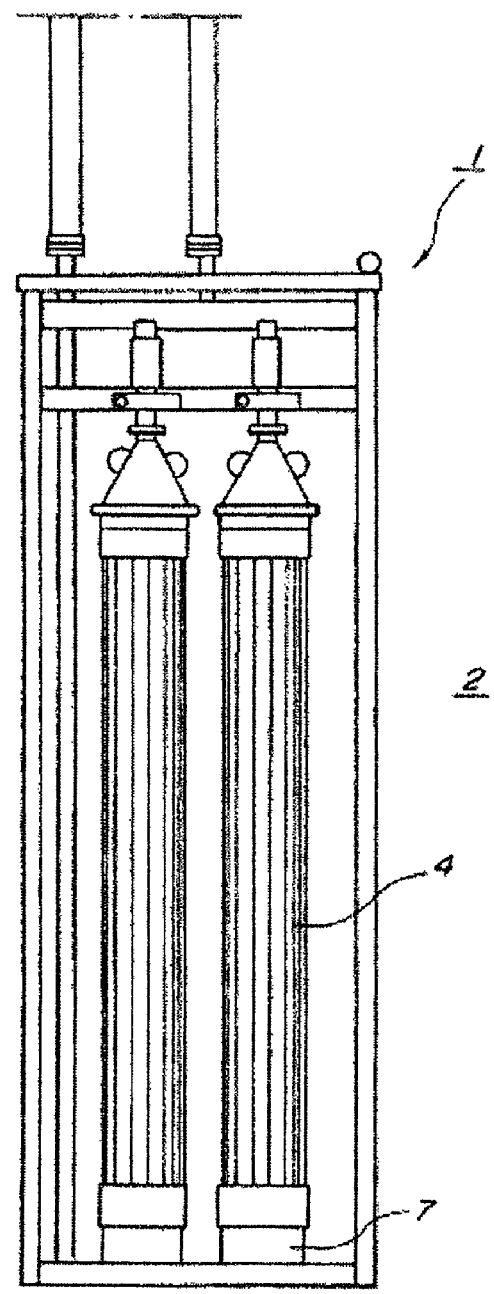
FIG. 1 illustrates an overall structure of a membrane separation unit of the present invention from a side view including an intermittent gas flow apparatus according to the present invention.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

The embodiments of the membrane separation unit according to the present invention are explained in the following with reference to the drawings.

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise. For example, reference to "an auxiliary pipe linked to a column pipe" does not limit the "auxiliary pipe" to only one pipe, and additional auxiliary pipes can be linked to the column pipe or to multiple column pipes.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the specification and claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The various embodiments disclosed herein can be used separately and in various combinations unless specifically stated to the contrary.

The present invention provides an intermittent gas flow unit which is structured and arranged for providing intermittent gas flow from the unit even when gas is continuously supplied thereto. The intermittent gas flow unit according to the present invention can be used in any environment wherein intermittent gas flow is desired. For example and without limitation, the intermittent gas flow unit can used in membrane filtration systems wherein water is purified with activated sludge and passed through membrane filters, such as a bundle of hollow fiber membranes that are enclosed in a tubular housing or are positioned in an open unit. Preferably, the hollow fiber membranes comprise open bundles of hollow fiber membranes. See, for example, U.S. Pat. No. 6,245,239, incorporated by reference herein in its entirety, which discloses cleaning membranes arranged in submerged modules including use of cyclic aeration with lower and higher air flow rates. This patent also describes filtration of activated sludge using submerged membranes that are not enclosed.

Advantages of providing intermittent flow of gas according to the present invention include a simple design that is easy and inexpensive to manufacture, and which can be used in systems that do not require complicated and/or expensive apparatus and/or construction such as expensive piping design and/or costly pumps and/or valves.

A first illustrated embodiment of a membrane separation unit according to the present invention provides a membrane separation unit filtering and separating liquid in a treatment tank by pumping liquid through a filtration membrane submerged in the liquid in the treatment tank. The membrane separation unit includes a container provided in the treatment tank positioned below the filtration membrane, with the container being provided internally with an air chamber; a gas supplier supplying gas into the container; a column pipe penetrating a top wall of the container and linking the air chamber to an external area; an auxiliary pipe including a first end portion linked to the column pipe and a second end portion branched from the column pipe, and having a lower end portion thereof disposed higher than a lower end portion of the column pipe by a predetermined height; and an auxiliary pipe external cylinder including a cylinder and a closure, the cylinder being fitted to an external periphery of the auxiliary pipe in the air chamber having a predetermined distance in between, the closure being provided below the lower end portion of the auxiliary pipe and closing a lower portion of the cylinder.

According to this first embodiment of the membrane separation unit of the present invention, when the container is submerged in liquid in a treatment tank, the liquid in the treatment tank flows into the container from openings, such as on a lower surface and the like. Then, the liquid also fills the air chamber of the container, the column pipe, the auxiliary pipe, and the auxiliary pipe external cylinder. As gas is released from the gas supplier linked inside the container, air fills the air chamber of the container, and a liquid level inside the air chamber is lowered. When the liquid level is lowered to a lower end opening surface of the auxiliary pipe, the air starts to fill the auxiliary pipe. The air is then released to an external area from the auxiliary pipe through the column pipe, and bubbles are supplied to the filtration membrane provided above, and thus aeration occurs.

As the air is released from the air chamber of the container to the external area through the auxiliary pipe and the column pipe for aerating the filtration membrane, air pressure in the air chamber is lowered, and the liquid level inside the air chamber rises above the lower end opening surface of the auxiliary pipe. In this state, the liquid in the treatment tank flows back into the column pipe, the auxiliary pipe, and the air chamber, and fills the components. The aeration thus stops.

As gas is released from the gas supplier linked inside the container, air again fills the air chamber, and the liquid level inside the air chamber is lowered. When the liquid level is lowered to the lower end opening surface of the auxiliary pipe, the air starts to fill the auxiliary pipe. The air is then released to the external area from the auxiliary pipe through the column pipe, and bubbles are supplied to the filtration membrane for aeration. As described above, the aeration repeatedly occurs and stops, and thus intermittent aeration operation is performed.

A second illustrated embodiment of the membrane separation unit according to the present invention provides a membrane separation unit having a plurality of hollow fiber membrane modules and filtering and separating liquid in a treatment tank by pumping liquid through the hollow fiber membranes in the hollow fiber membrane modules submerged in the liquid in the treatment tank. The membrane separation unit includes a bundled portion provided with openings for aeration disposed at predetermined positions, so as to avoid positions to which end portions of the plurality of hollow fiber membranes are fixed; a pedestal member provided in contact with the bundled portion, receiving at least self weight of the plurality of hollow fiber membranes, and providing an air chamber below the bundled portion; and a gas supplier provided below the pedestal member and supplying gas thereinto. The pedestal member includes a first air chamber provided below the bundled portion; a second air chamber provided below the first air chamber and above the gas supplier; an upper wall forming a partition panel partitioning the first air chamber and the second air chamber; a column pipe penetrating the partition panel and linking the first air chamber and the second air chamber; an auxiliary pipe including a first end portion linked to the column pipe in the second air chamber and a second end portion branched from the column pipe, and having a lower end portion thereof disposed at a position higher than a lower end portion of the column pipe by a predetermined height; and an auxiliary pipe external cylinder including a cylinder and a closure, the cylinder being fitted to an external periphery of the auxiliary pipe in the second air chamber having a predetermined distance in between, the closure being provided below the lower end portion of the auxiliary pipe and closing a lower portion of the cylinder.

According to the second embodiment of the membrane separation unit of the present invention, when the pedestal member is submerged in liquid in a treatment tank, the liquid in the treatment tank flows into the pedestal member from openings, such as on a lower surface and the like. Then, the liquid also fills the first air chamber and the second air chamber of the pedestal member, the column pipe, the auxiliary pipe, and the auxiliary pipe external cylinder. As gas is released from the gas supplier provided below the pedestal member, air fills the second air chamber of the pedestal member, and a liquid level inside the second air chamber is lowered. When the liquid level is lowered to a lower end opening surface of the auxiliary pipe, the air starts to fill the auxiliary pipe. Then, the air fills the first air chamber, as being supplied from the auxiliary pipe through the column pipe. Bubbles are then supplied from the openings for aeration of the bundled portion to the hollow fiber membranes, and thus aeration occurs.

As the air is supplied from the second air chamber to the first air chamber through the auxiliary pipe and the column pipe for aeration, air pressure in the second air chamber is lowered, and the liquid level inside the second air chamber rises above the lower end opening surface of the auxiliary pipe. In this state, the liquid in the treatment tank flows back into the first air chamber, the column pipe, and the auxiliary pipe through the openings for aeration of the bundled portion, and fills the components. The aeration thus stops.

As gas is released from the gas supplier provided below the pedestal member, air again fills the second air chamber, and the liquid level inside the second air chamber is lowered. When the liquid level is lowered to the lower end opening surface of the auxiliary pipe, the air starts to fill the auxiliary pipe. Then, the air fills the first air chamber, as being supplied from the auxiliary pipe through the column pipe. Bubbles are then supplied from the openings for aeration of the bundled portion to the hollow fiber membranes, and thus aeration occurs. As described above, the aeration repeatedly occurs and stops, and thus intermittent aeration operation is achieved.

Any of the embodiments of the intermittent gas flow apparatus can include one or more filters at openings into the intermittent gas flow apparatus. For example, one or more filters can be included at least one of an opening of the auxiliary pipe external cylinder and an opening of the pedestal member. The filters can be structured and arranged, for example, to prevent suspended matters from being deposited in the auxiliary pipe external cylinder, and thus smoothen intermittent flow of gas, such as intermittent aeration operation.

Any of the embodiments of the intermittent gas flow apparatus can include an insertion length adjuster adjusting an insertion length of the auxiliary pipe inserted in the auxiliary pipe external cylinder. The insertion length adjuster can be any structure that permits an adjustment of the insertion length of the auxiliary pipe in the auxiliary pipe external cylinder, such as a screw mechanism. Varying of the insertion length allows adjustment of an intermittent aeration cycle of the intermittent gas flow apparatus.

Any of the embodiments of the intermittent gas flow apparatus can further include a gas entry preventer preventing gas supplied from the gas supplier from directly entering the column pipe through a lower opening thereof. The gas entry preventer prevents gas released from the gas supplier from directly entering the column pipe through the lower opening, thus preventing the intermittent aeration cycle from being disturbed and allowing consistent operation. The gas entry preventer can comprises various structural arrangements to achieve a direct flow of gas from the gas supplier into the lower opening of the column pipe. For example, the lower portion of the column pipe can be L-shaped so that the opening is laterally facing, instead of downward facing. Moreover, for example, a lower blocking element can be included over the lower opening with the column pipe having one or more openings on a side wall of the column pipe or the blocking element.

Any of the embodiments of the intermittent gas flow apparatus including an upper side wall can further include an opening proximate to the upper wall, such as an opening proximate to the partition panel of the pedestal member and in a side surface portion in the first air chamber and linked inside the treatment tank. The opening, such as the opening provided proximate to the partition panel of the pedestal member and in the side surface portion in the first air chamber and linked inside the treatment tank, can discharge suspended matters deposited on the partition panel of the first air chamber from the opening into the treatment tank external to the first air chamber.

First Embodiment

In FIGS. 1 through 3F, a membrane separation unit 1 filtering and separating liquid in a treatment tank 2 is provided with a plurality of hollow fiber membrane modules 4. In the membrane separation unit 1, liquid is pumped through hollow fiber membranes 3, which are submerged in the liquid in the treatment tank 2 and function as filtration membranes.

The membrane separation unit 1 includes a bundled portion 6, an intermittent gas flow apparatus in a form of a pedestal member 7, and an aeration pipe 8. The bundled portion 6 is provided with openings for aeration 5, which are disposed at predetermined positions, so as to avoid positions to which end portions of the plurality of hollow fiber membranes 3 are fixed. The pedestal member 7, which is provided in contact with the bundled portion 6, receives at least self weight of the plurality of hollow fiber membranes 3 as well as serves as a container that constitutes an air chamber below the bundled portion 6. Thus, the bundle portion 6 can be supported entirely by the pedestal member 7. However, the bundle portion 6 can be partially supported by the pedestal member 7, or can be supported by other apparatus. The aeration pipe 8, which is provided below the pedestal member 7, serves as a gas supplier supplying gas into the pedestal portion 7.

Figure 2:
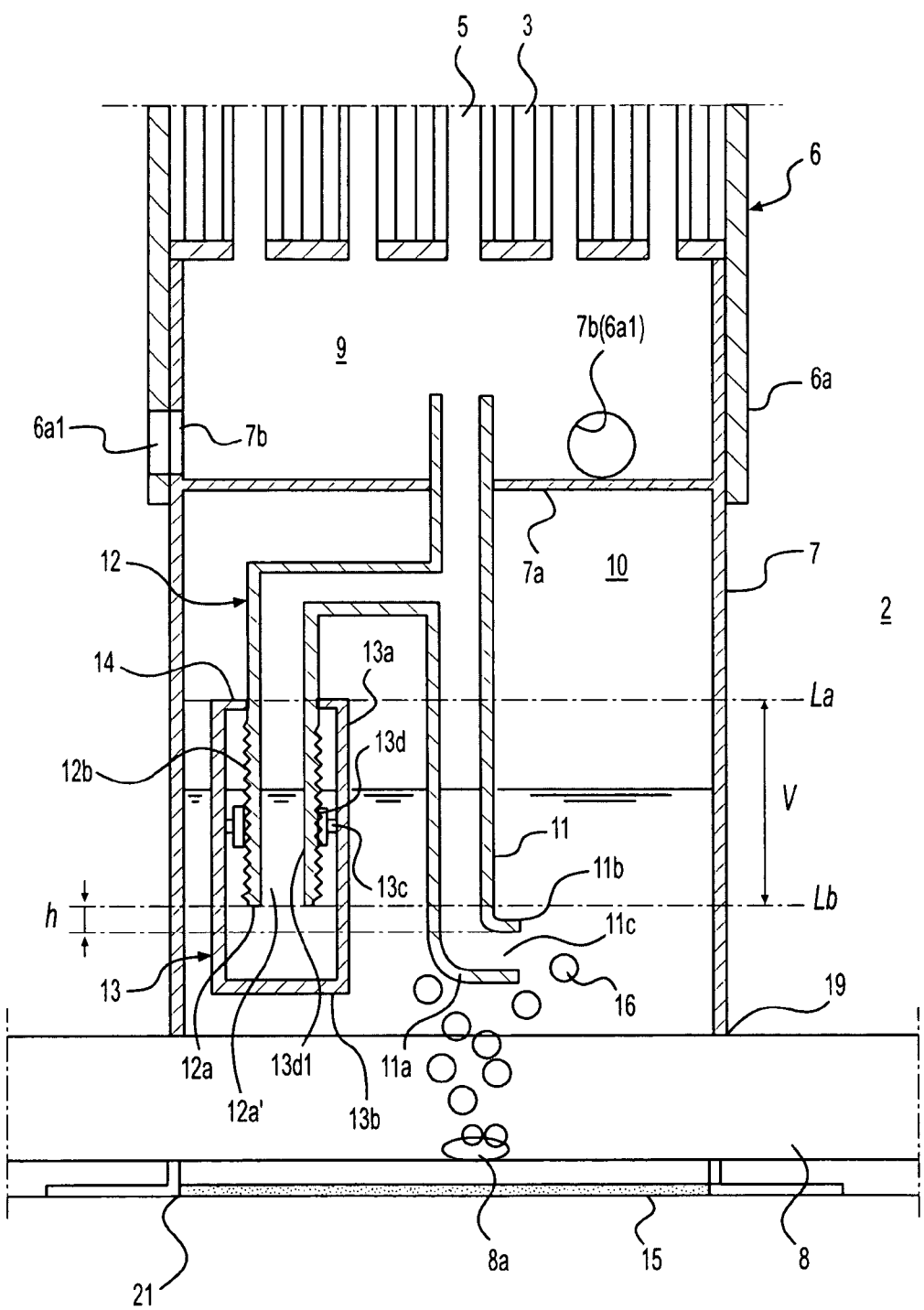
FIG. 2 is a schematic view illustrating a structure of a lower portion of a hollow fiber membrane module of the membrane separation unit according to a first embodiment of the present invention.

Air is constantly supplied to the aeration tube 8, and bubbles are constantly released into the pedestal member 7 through an aeration hole 8a provided in a lower surface of the aeration pipe 8. FIG. 2 shows a structure in which the aeration tube 8 passes through the lower portion of the pedestal 7. The portion of the pedestal that the aeration tube 8 passes through includes an aperture 19 larger than the external diameter of the aeration tube 8. Activated sludge can enter through gaps between the pedestal member 7 and the aeration tube 8.

The aeration tube 8 may be positioned at various positions with respect to the pedestal member 7 as long as air from the aeration tube, such as in the form of bubbles, can enter the pedestal member 7. For example, the aeration tube 8 can be positioned at a location lower than the pedestal 7, without contacting the pedestal member 7, so as to receive bubbles released from 8a into the bottom opening of the pedestal member 7.

The pedestal member 7 includes a first air chamber 9, a second air chamber 10, a partition panel 7a, a column pipe 11, an auxiliary pipe 12, and an auxiliary pipe external cylinder 13. The first air chamber 9 is provided below the bundled portion 6. The second air chamber 10 is provided below the first air chamber 9 and above the aeration pipe 8. The partition panel 7a partitions the first air chamber 9 and the second air chamber 10. The column pipe 11 penetrates the partition panel 7a and links the first air chamber 9 and the second air chamber 10. The auxiliary pipe 12 includes a first end portion linked to the column pipe 11 in the second air chamber 10, and a second end portion branched from the column pipe 11. A lower end portion 12a of the auxiliary pipe 12 is disposed at a position higher than a lower end portion 11a of the column pipe 11 by a predetermined height h, which is measured from the lowest portion of the opening 12a' of the auxiliary pipe 12 at the lower portion 12a to the highest portion 11b of the opening 11c at the lower end portion 11a of the pipe 11. The auxiliary pipe external cylinder 13 includes a cylinder 13a and a closure 13b, the cylinder 13a being fitted to an external periphery of the auxiliary pipe 12 in the second air chamber 10 having a predetermined distance in between, the closure 13b being provided below the lower end portion 12a of the auxiliary pipe 12 and closing a lower portion of the cylinder 13a forming a chamber through which water to be past through membranes can enter at a location above lower end portion 12a of auxiliary pipe 12.

The predetermined distance between the auxiliary pipe external cylinder 13 and the auxiliary pipe 12 is preferably set in order to prevent sludge from clogging the apparatus. The distance is preferably 2 mm or greater, and more preferably 5 mm or greater as a lower limit. Moreover, for size efficiency, an upper limit is preferably less than 20 mm, and more preferably less than 10 mm.

An end portion of the lower end portion 11a of the column pipe 11 according to the present embodiment is bent horizontally. As shown in FIG. 2, the lower end portion 11a of the column pipe 11 is an upper end 11b of an opening of the lower end portion 11a.

Filter 14 is provided to an upper opening of the auxiliary pipe external cylinder 13 and filter 15 is provided to a bottom opening 21 of the pedestal member 7. The size and material of the filters 14 and 15 can be varied and one having ordinary skill in the art following the guidelines set forth herein would understand materials and parameters for the filters. For example, in order to ensure air flow and to prevent suspended matters from clogging the openings for aeration 5, a mesh filter having an aperture diameter of 0.1 mm to 10 mm is preferred, more preferably an aperture diameter of 0.5 mm to 5 mm. As materials of the filters 14 and 15, it is effective to use thermoplastic polymers, such as polyethylene, polypropylene, and the like, and/or antibacterial materials, such as copper and silver.

An insertion length adjuster is further provided to adjust an insertion length of the auxiliary pipe 12 inserted in the auxiliary pipe external cylinder 13. As the insertion length adjuster, a male thread 12b and a female thread 13d1 screwed thereinto are provided, the male thread 12b being provided on the external periphery of the auxiliary pipe 12, the female thread 13d1 being provided in a ring member 13d, which is provided inside the cylinder 13a having a support member 13c in between. A plurality of support members 13c can be provided projecting in a diameter direction and thereby radially extending inside the cylinder 13a. Sufficient space is provided between the support members 13c so as to allow air and water (gas and liquid) to flow in and out.

The female thread 13d1, which is provided in the ring member 13d provided inside the cylinder 13a of the auxiliary pipe external cylinder 13 through the projecting support member 13c, is screwed into the male thread 12b provided on the external periphery of the auxiliary pipe 12. Rotating the auxiliary pipe external cylinder 13 clockwise or counterclockwise adjusts the insertion length of the auxiliary pipe 12 inserted in the auxiliary pipe external cylinder 13.

Furthermore, a gas entry preventer is provided to prevent bubbles 16 released from the aeration pipe 8 from directly entering the column pipe 11 through the lower opening thereof. As the gas entry preventer, the lower end portion 11a of the column pipe 11 is bent horizontally and formed into an L shape. Thereby, the bubbles 16 released from the aeration pipe 8 are prevented from directly entering the opening of the lower end portion 11a of the column pipe 11.

In addition, an opening 7b is provided proximate to the partition panel 7a of the pedestal member 7 and in a side surface portion of the first air chamber 9, and is linked inside the treatment tank 2. Suspended matters deposited on the partition panel 7a can be removed through the opening 7b and an opening 6a1, which is provided in a skirt 6a of the bundled portion 6 to match up with the opening 7b. Therefore, the openings 6a1 overlap with the opening 7b. Preferably, the openings are circular, and the openings have the same central point.

With the structure above, when the pedestal member 7 is submerged in the liquid in the treatment tank 2, the liquid in the treatment tank 2 can flow into the pedestal member 7 from openings, such as on the lower surface and the like. For example, the liquid flows in from the openings, including the bottom opening 21 through filter 15, opening 6a1, opening 7b, gaps between the aeration tube 8 and the pedestal member 7, and the like. Then, the liquid also fills the first air chamber 9 and the second air chamber 10 of the pedestal member 7, the column pipe 11, the auxiliary pipe 12, and the auxiliary pipe external cylinder 13. Once a predetermined volume of air is supplied from the aeration hole 8a of the aeration pipe 8 and held inside the second air chamber 10, the unit then enters a standby state, as shown in FIG. 3A.

Thereafter, as bubbles 16 are released from the aeration hole 8a of the aeration pipe 8 provided below the pedestal member 7, air fills the second air chamber 10 of the pedestal member 7, and a liquid level inside the second air chamber 10 is lowered, as shown in FIG. 3B. When the liquid level is lowered to the opening surface of the lower end portion 12a of the auxiliary pipe 12, the air starts to fill the auxiliary pipe 12, as shown in FIG. 3C. Then, the air fills the first air chamber 9 through the auxiliary pipe 12, as shown in FIG. 3D. Bubbles 16 are then supplied from the openings for aeration 5 of the bundled portion 6 to the hollow fiber membranes 3, and thus aeration occurs.

As the air is supplied from the second air chamber 10 to the first air chamber 9 through the auxiliary pipe 12, air pressure in the second air chamber 10 is lowered, and the liquid level inside the second air chamber 10 rises above the opening surface of the lower end portion 12a of the auxiliary pipe 12, as shown in FIG. 3E. In this state, the liquid in the treatment tank 2 flows back into the first air chamber 9, the column pipe 11, and the auxiliary pipe 12 through the openings for aeration 5 of the bundled portion 6, and fills the components, as shown in FIG. 3F. The aeration thus stops.

As bubbles 16 are released from the aeration hole 8a of the aeration pipe 8 provided below the pedestal member 7, as shown in FIG. 3B, air again fills the second air chamber 10, and the liquid level inside the second air chamber 10 is lowered. When the liquid level is lowered to the opening surface of the lower end portion 12a of the auxiliary pipe 12, the air starts to fill the auxiliary pipe 12 (refer to FIG. 3D). Then, the air fills the first air chamber 9 through the auxiliary pipe 12. Bubbles are then supplied from the openings for aeration 5 of the bundled portion 6 to the hollow fiber membranes 3, and thus aeration occurs. As described above, the aeration repeatedly occurs and stops, and thus intermittent aeration operation is performed.

In the process above, an intermittent aeration amount is represented by a substantial volume V in the pedestal member 7, as shown in FIGS. 3A to 3E. The substantial volume V is a portion between a level La and a level Lb, which is an overlapping portion of the auxiliary pipe 12 inserted in the auxiliary pipe external cylinder 13 and the auxiliary pipe external cylinder 13 in the second air chamber 10. La is located at the lowest point at which water can enter the area between the auxiliary pipe 12 and the external cylinder 13, and Lb is located at the highest height that water can enter the auxiliary pipe 12.

Providing the filters 14 and 15 to the opening of the auxiliary pipe external cylinder 13 and the opening 21 of the pedestal member 7, respectively, prevents suspended matters from being deposited in the auxiliary pipe external cylinder 13, and thus smoothens intermittent aeration operation.

Further, the insertion length adjuster, which is the male thread 12b provided on the external periphery of the auxiliary pipe 12 screwed into the female thread 13d1 of the ring member 13d internally provided to the auxiliary pipe external cylinder 13, adjusts the insertion length of the auxiliary pipe 12 inserted in the auxiliary pipe external cylinder 13. Adjusting the inserting length allows adjustment of the volume V, which is represented by the overlapping amount of the auxiliary pipe 12 inserted in the auxiliary pipe external cylinder 13 and the auxiliary pipe external cylinder 13 in the second air chamber 10, and is translated into the intermittent aeration amount. Thereby, an intermittent aeration cycle can be adjusted.

Furthermore, the gas entry preventer, which is the lower end portion 11a of the column pipe 11 horizontally bent and having an L shape, prevents bubbles 16 released from the aeration pipe 8 from directly entering the column pipe 11 through the lower side opening. Thereby, the intermittent aeration cycle is not disturbed and performed consistently.

In addition, the opening 7b, which is provided proximate to the partition panel 7a of the pedestal member 7 and in the side surface portion in the first air chamber 9 and is linked inside the treatment tank 2, discharges suspended matters deposited on the partition panel 7a of the first air chamber 9 from the opening 7b into the treatment tank 2 external to the first air chamber 9.

With the structure above, air is continuously supplied from the aeration hole 8a of the aeration pipe 8, which is the gas supplier, and thus the aeration hole 8a is not clogged due to suspended matters deposited at a bottom portion of the treatment tank 2. Further, the intermittent aeration mechanism provided above the aeration pipe 8 prevents wear due to rubbing of the hollow fiber membranes 3 as in continuous aeration, and thus extends life of the hollow fiber membranes 3.

Second Embodiment

Figure 4:
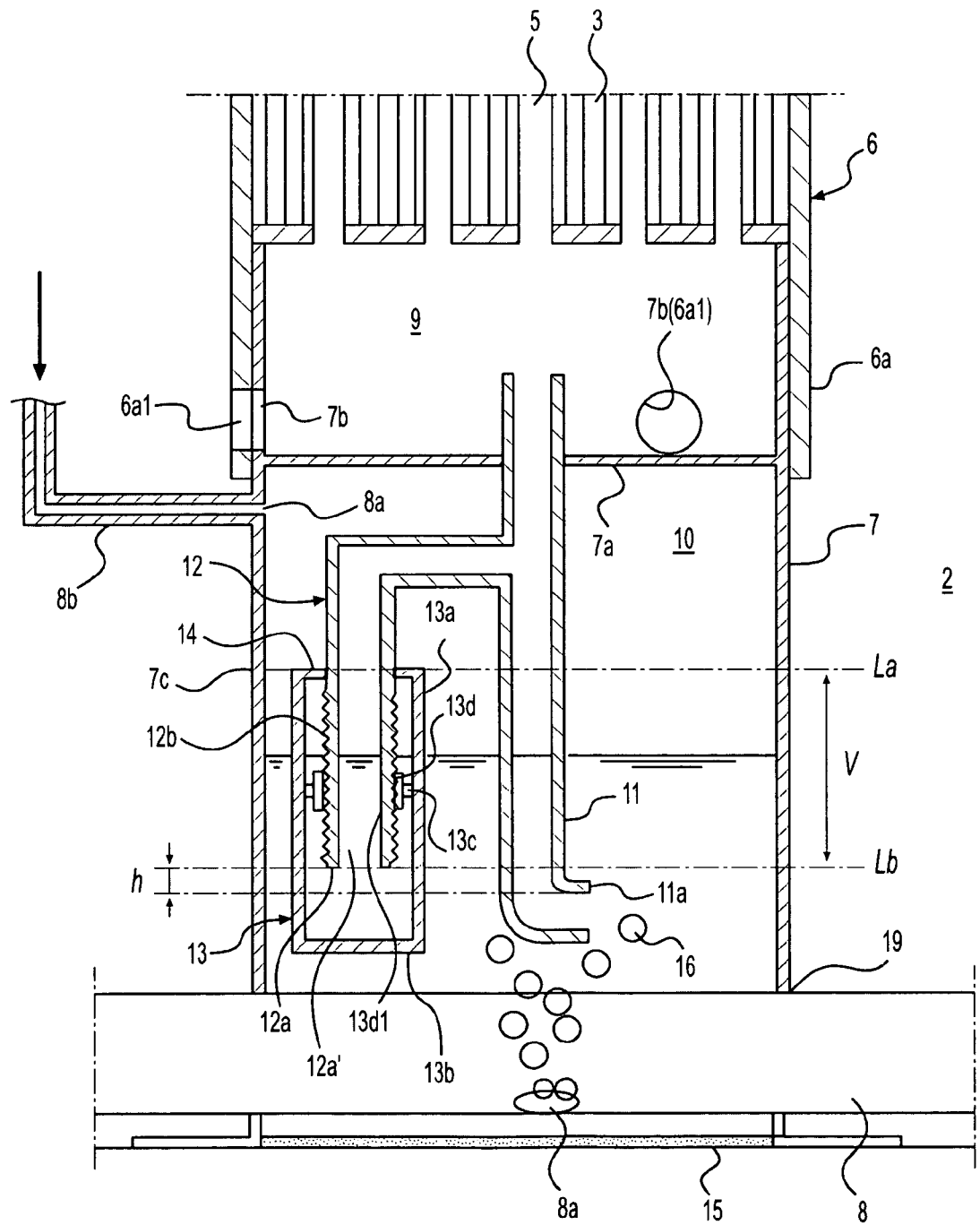
FIG. 4 is a schematic cross-sectional view illustrating a structure of a membrane separation unit according to a second embodiment of the present invention including an intermittent gas flow apparatus according to the present invention.

FIG. 4 is a schematic cross-sectional view illustrating a structure of a membrane separation unit according to a second embodiment of the present invention. Components identically structured to those in the first embodiment are indicated with identical numerical references, and explanations thereof are omitted. In the present embodiment, the aeration pipe 8b as a gas supplier is linked to a side wall 7c of the second air chamber 10 of the pedestal member 7 as a container, so that air (gas) is released into the second air chamber 10. In this case, the aeration pipe 8 provided below the pedestal member 7 may be eliminated or used along with the aeration pipe 8b linked to the second air chamber 10, as shown in FIG. 4. The structure of remaining components is the same as that in the first embodiment, and the same effects can be obtained.

Third Embodiment

Figure 5:
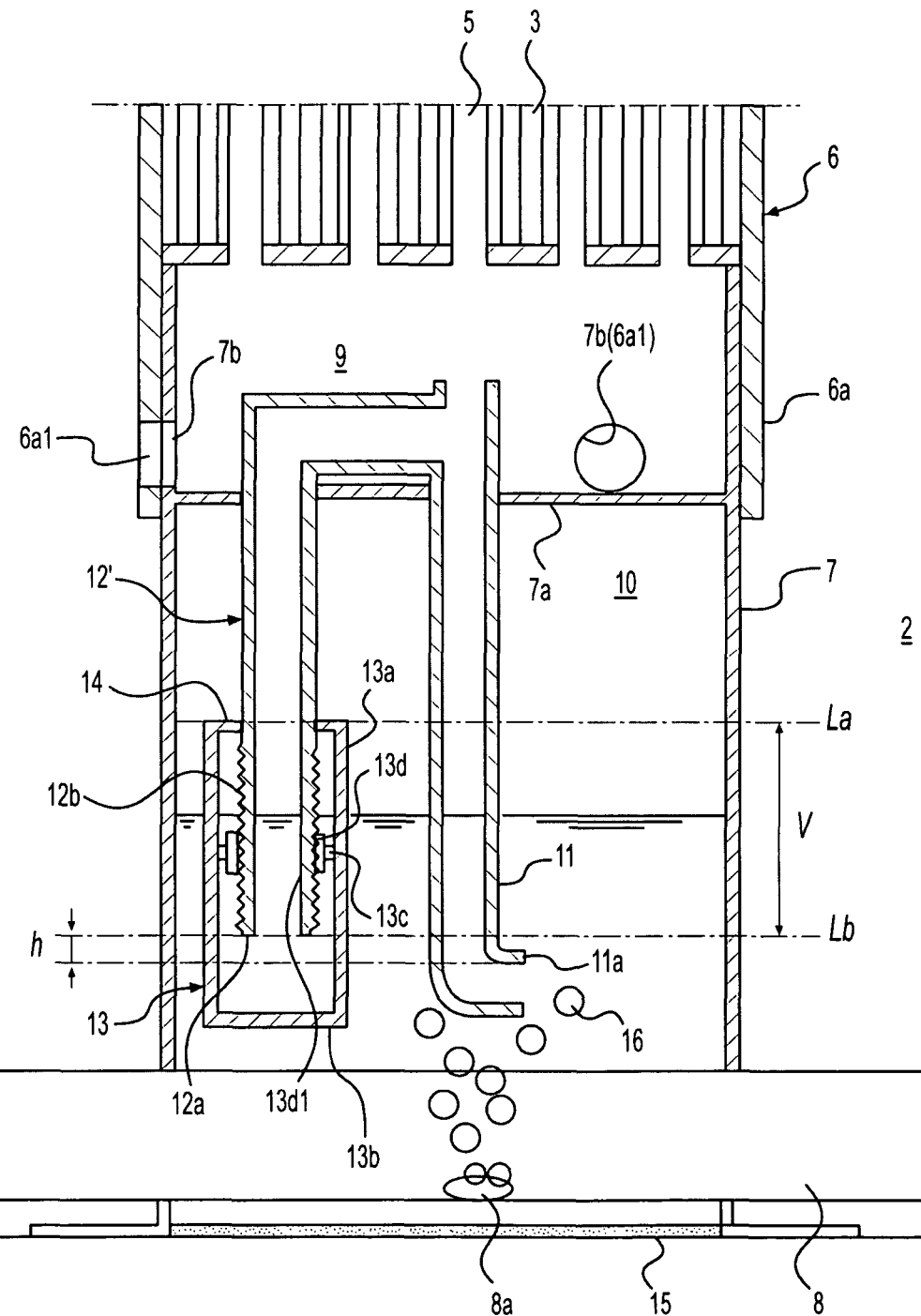
FIG. 5 is a schematic cross-sectional view illustrating a structure of a membrane separation unit according to a third embodiment of the present invention.

FIG. 5 is a schematic cross-sectional view illustrating a structure of a membrane separation unit according to a third embodiment of the present invention. Components identically structured to those in the first embodiment are indicated with identical numerical references, and explanations thereof are omitted. In the previous embodiment, the auxiliary pipe 12 is branched from the column pipe 11 in the second air chamber 10. In the present embodiment, however, the auxiliary pipe 12' is passed through the partition panel 7a and extended to the first air chamber 9. The auxiliary pipe 12' is branched from the column pipe 11 in the first air chamber 9. The structure of remaining components is the same as that in the first embodiment, and the same effects can be obtained.

Fourth Embodiment

Figure 6:
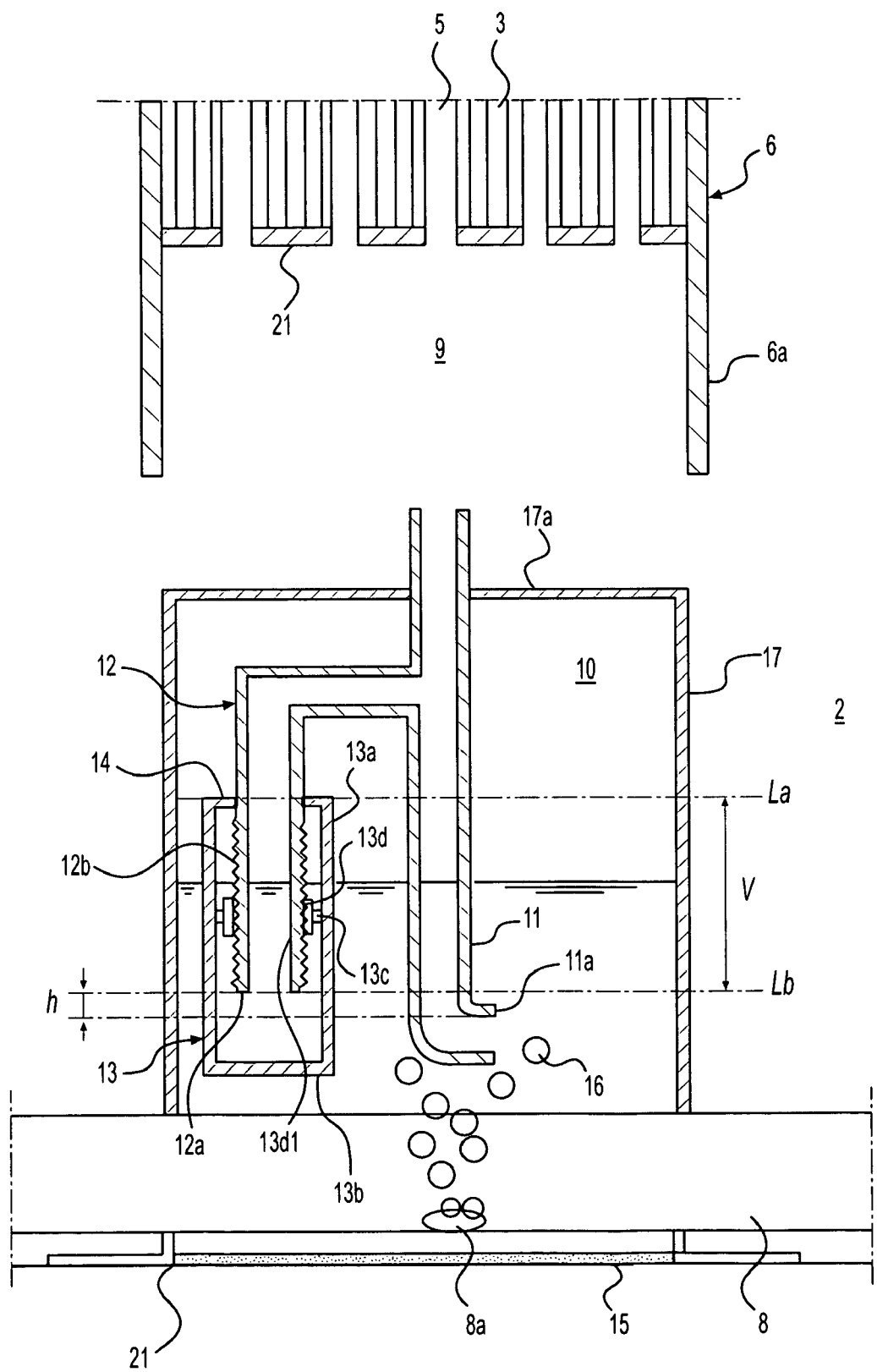
FIG. 6 is a schematic cross-sectional view illustrating a structure of a membrane separation unit according to a fourth embodiment of the present invention.

FIG. 6 is a schematic cross-sectional view illustrating a structure of a membrane separation unit according to a fourth embodiment of the present invention. Components identically structured to those in the first embodiment are indicated with identical numerical references, and explanations thereof are omitted. In the previous embodiment, the bundled portion 6, which bundles the lower portion of the hollow fiber membrane module 4, is supported by the pedestal member 7 as a container. In the present embodiment, however, the hollow fiber membrane module 4 is separately supported by a supporter not shown in the drawing. The container 17, which includes the air chamber 10 therein, is provided below the bundled portion 6 bundling the lower portion of the hollow fiber membrane module 4 as a filtration membrane, having a predetermined distance inbetween. For example, the distance between the upper wall 17a and the lower portion of the membranes 4 can comprise various distances, and the distance is preferably within a width of the bundled portion, such as the diameter of the bundled portion 6. The container 17 is provided in the treatment tank 2 and can be positioned directly below the hollow fiber membrane module 4.

In the present embodiment, the membrane separation unit 1 performs suction from one side of the hollow fiber membrane module 4 submerged in liquid in the treatment tank 2 and functioning as the filtration membrane, and thus filters and separates the liquid in the treatment tank 2. The membrane separation unit 1 includes the container 17, the aeration pipe 8, the column pipe 11, the auxiliary pipe 12, and the auxiliary pipe external cylinder 13. The container 17 is provided in the treatment tank 2 and below the hollow fiber membrane module 4 as the filtration membrane, and is provided internally with the air chamber 10. The aeration pipe 8 is a gas supplier that supplies gas into the container 17. The column pipe 11 penetrates the upper wall 17a of the container 17, and links the air chamber 10 to an external area. The auxiliary pipe 12 includes the first end portion linked to the column pipe 11, and the second portion branched from the column pipe 11. The lower end portion of the auxiliary pipe 12 is disposed at a position higher than the opening at the lower end portion of the column pipe 11 by a predetermined height to ensure intermittent operation. The height is preferably, as a lower limit, 2 mm or greater, more preferably 5 mm or greater, or even more preferably 10 mm or greater. In order to provide an efficient size, an upper limit of the height is preferably less than 30 mm, more preferably less than 20 mm, and even more preferably less than 15 mm. The auxiliary pipe external cylinder 13 includes the cylinder 13a and the closure 13b, the cylinder 13a being fitted to the external periphery of the auxiliary pipe 12 in the air chamber 10 having a predetermined distance in between in order to prevent sludge clogging, the closure 13b being provided below the lower end portion of the auxiliary pipe 12 and closing the lower portion of the cylinder 13a. The distance is preferably 2 mm or greater, and more preferably 5 mm or greater as a lower limit. In order to provide an efficient size, an upper limit of the distance is preferably less than 20 mm and more preferably less than 10 mm.

With the structure above, when the container 17 is submerged in the liquid in the treatment tank 2, the liquid in the treatment tank 2 flows into the container 17 from openings, such as on the lower surface and the like. Then, the liquid also fills the air chamber 10 of the container 17, the column pipe 11, the auxiliary pipe 12, and the auxiliary pipe external cylinder 13. As bubbles 16 are released from the aeration hole 8a of the aeration pipe 8, which serves as a gas supplier linked inside the container 17, air fills the air chamber 10 of the container 17, and a liquid level inside the air chamber 10 is lowered. When the liquid level is lowered to the lower end opening surface of the auxiliary pipe 12, the air starts to fill the auxiliary pipe 12. The air is then released into the external treatment tank 2 from the auxiliary pipe 12 through the column pipe 11, and bubbles are supplied to the hollow fiber membrane module 4 provided above as the filtration membrane, and thus aeration occurs.

As the air is released from the air chamber 10 of the container 17 into the external treatment tank 2 through the auxiliary pipe 12 and the column pipe 11 for aerating the hollow fiber membrane module as the filtration membrane, air pressure in the air chamber 10 is lowered, and the liquid level inside the air chamber 10 rises above the lower end opening surface of the auxiliary pipe 12. In this state, the liquid in the treatment tank 2 flows back into the column pipe 11, and the auxiliary pipe 12, and the air chamber 10, and fills the components. The aeration thus stops.

As bubbles 16 are released from the aeration hole 8a of the aeration pipe 8 linked inside the container 17 and functioning as the gas supplier, air again fills the air chamber 10, and the liquid level inside the air chamber 10 is lowered. When the liquid level is lowered to the lower end opening surface of the auxiliary pipe 12, the air starts to fill the auxiliary pipe 12. The air is then released into the external treatment tank 2 from the auxiliary pipe 12 through the column pipe 11, and bubbles 16 are supplied to the hollow fiber membrane module 4 as the filtration membrane for aeration. As described above, the aeration repeatedly occurs and stops, and thus intermittent aeration operation is performed. The structure of remaining components is the same as that in the first embodiment, and the same effects can be obtained.

Fifth Embodiment

Figure 7:
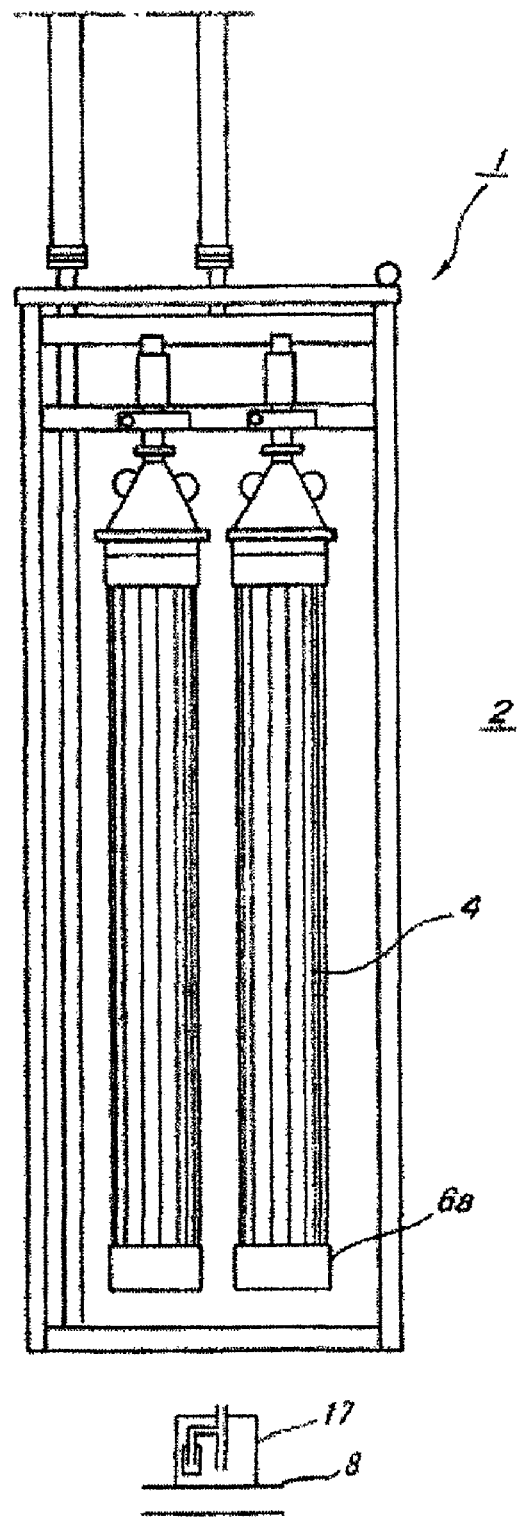
FIG. 7 is a schematic cross-sectional view illustrating a structure of a membrane separation unit according to a fifth embodiment of the present invention.

FIG. 7 is a schematic cross-sectional view illustrating a structure of a membrane separation unit according to a fifth embodiment of the present invention. Components identically structured to those in the fourth embodiment are indicated with identical numerical references, and explanations thereof are omitted. The previous embodiment is an example in which the container 17 is provided immediately below the hollow fiber membrane module 4 as a filtration membrane. In the present embodiment, however, the container 17 is provided below a plurality of hollow fiber membrane modules 4 and at a place between (not immediately below) the hollow fiber membrane modules 4. The structure of remaining components is the same as that in the first embodiment, and the same effects can be obtained.

The structures described above allow intermittent aeration operation with a simple construction, without requiring a complex electric control system, thereby extending life of filtration membranes. Although the embodiments described above explain cases in which the hollow fiber membrane module 4 is employed as a filtration membrane, a flat membrane module may be employed instead of the hollow fiber membrane module 4. The flat membrane module can also constitute a membrane separation unit performing suction from one side of a filtration membrane submerged in liquid in a treatment tank 2, and filtering and separating the liquid in the treatment tank 2.

Application examples of the present invention include a membrane separation unit performing suction from one side of filtration membranes submerged in liquid in a treatment tank, and filtering and separating the liquid in the treatment tank; and a membrane separation unit having a plurality of hollow fiber membrane modules, performing suction from one side of filtration membranes submerged in liquid in a treatment tank, and filtering and separating the liquid in the treatment tank.

As can be seen in the various embodiments disclosed herein, the intermittent gas flow apparatus includes an internal gas chamber and at least one gas supply inlet that can continuously supply gas to the internal gas chamber. The intermittent gas flow apparatus further includes a column pipe that protrudes through a wall of the internal gas chamber. An auxiliary pipe is linked to the column pipe. A closed tubular member, which can have various cross-sections, such as but not limited to rectangular, square, circular, elliptical, surrounds a lower portion of the auxiliary pipe and provides for flow of gas and/or liquid into the tubular member in the space between the wall of the tubular member and the auxiliary pipe.

The parameters La and Lb, and therefore the volume V of the internal gas chamber, the flow of gas into the internal gas chamber and the depth of the intermittent gas flow apparatus in the liquid are configured relative to each other to provide for the intermittent flow of gas based upon the continuous flow of gas into the internal gas chamber.

To prevent sludge clogging, a lower limit of the inner diameter of column pipe 11 is preferably 5 mm or greater, and more preferably 15 mm or greater. To ensure the siphon effect, an upper limit is preferably less than 40 mm.

To prevent sludge clogging, a lower limit of the inner diameter of the auxiliary pipe 12 is preferably 5 mm or greater, and more preferably 15 mm or greater. To ensure the siphon effect, an upper limit is preferably less than 40 mm.

The distance between the opening 12a' at the lower portion of auxiliary pipe 12 and the closure 13b of auxiliary piper external cylinder 13 can be varied while considering the preventing of sludge clogging and an efficient upper size. For example, the distance is preferably a lower limit of 10 mm or greater, more preferably 30 mm or greater, and even more preferably 50 mm or greater, in order to prevent sludge clogging; and an upper limit of the distance is preferably less than 150 mm, more preferably less than 100 mm, and even more preferably less than 70 mm, in order to provide an efficient sizing of the apparatus.

The intermittent gas flow apparatus can be designed to provide various amounts of gas flowing through the apparatus, and with the gas being intermittently supplied during intermittent gas cycles having various cycle times during which there is intermittent flow of gas. For example, the intermittent gas flow apparatus can be constructed and arranged to preferably have an intermittent gas cycle or intermittent aeration cycle of 1 second or more and less than 10 seconds, and more preferably 2 seconds or more and less than 5 seconds. The length of the cycle can be extended, for example, by increasing V or reducing the aeration amount per module.

While dimensions can be varied taking into consideration guidance provided herein for obtaining intermittent gas flow from a continuous gas source, exemplary dimensions include:

| | |
|---|---|
| Inner/outer diameter of container 17: | 130/139.5 mm |
| Height (inner side/outer side) of 17: | 245/250 mm |
| Inner/outer diameter of column pipe 11: | 20/26 mm |
| Inner/outer diameter of auxiliary pipe 12: | 20/26 mm |
| h: | 10 mm |
| Inner/outer diameter of auxiliary pipe external cylinder 13: | 41/48 mm |
| Length (inner side/outer side) of 13: | 175/180 mm |
| Radial gap between 12 and 13: | 7.5 mm |
| Distance between the lower end of 12 and the bottom of 13: | 55 mm |
| Distance between La and Lb: | 120 mm |
| V: | 1.59 L |

Moreover, the intermittent aeration can be varied depending upon the amount and cycle of intermittent gas desired. For example, the following preferred values are noted:

| | |
|---|---|
| Aeration amount per module: | 3-7 Nm³/hr as normal condition |
| Intermittent aeration cycle: | 2 sec. (at aeration of 3 Nm³/hr under the condition above) |

The intermittent gas flow apparatus can also include an upper side wall above the top wall through which top wall the column pipe can protrude. The upper side wall can comprise one or more wall portions, and preferably the upper side wall extends around an entire periphery of the upper wall. In this manner when in use, the upper side wall can form a chamber, such as with a lower portion of a bundle of hollow fiber membranes, with the upper wall forming a partition between this chamber and the internal air (gas) chamber. The periphery can be at any location with respect to the upper wall, such as an outermost periphery of the upper wall, or spaced inwardly from an outer edge of the upper wall. Preferably, the upper side wall extends around the entire outer periphery of the upper wall.

Thus, the upper side wall can form a first gas chamber and the internal gas chamber forming a second gas chamber. The intermittent gas flow apparatus can therefore be directly connected to a system, such as a water treatment and filtering system. However, the intermittent gas flow apparatus can also be positioned without direct connection, such as being positioned below a system element, such as a membrane module. Moreover, the intermittent gas flow apparatus can be positioned directly below the system element, such as directly below a membrane module, or can be positioned offset with respect to the system element, such as being offset with respect to the membrane module.

As discussed herewith, preferably, the gas is air and the liquid is water. However, any gas and liquid can be used depending upon any desired intermittent flow of gas.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. An intermittent gas flow apparatus comprising:
    an internal gas chamber including an upper wall;
    at least one inlet for supplying gas to the internal gas chamber;
    a column pipe that extends above the upper wall of the internal gas chamber, the column pipe including a lower end portion including a lower end portion opening in the internal gas chamber, the column pipe linking the internal gas chamber to an external area, external to the internal gas chamber for fluid flow between the internal gas chamber and the external area;
    an auxiliary pipe including one end portion connected to the column pipe for fluid flow between the auxiliary pipe and the column pipe, and another end portion branched off from the column pipe, the another end portion including an opening located in the internal gas chamber at a position higher than the lower end portion opening of the column pipe by a predetermined height; and
    an auxiliary pipe external tubular member including a closed end, the auxiliary pipe external tubular member surrounding the another end portion of the auxiliary pipe with the closed end being positioned below the opening in the another end portion of the auxiliary pipe, and spaced from the another end portion by a predetermined distance permitting fluid flow into the space between a wall of the tubular member and a wall of the auxiliary pipe.

2. The intermittent gas flow apparatus according to claim 1 wherein the column pipe extends through the upper wall.

3. The intermittent gas flow apparatus according to claim 2 further including an upwardly extending upper side wall above the upper wall.

4. The intermittent gas flow apparatus according to claim 3 wherein the upper side wall extends around an entire periphery of the upper wall.

5. The intermittent gas flow apparatus according to claim 4 further including an opening in the upper side wall.

6. The intermittent gas flow apparatus according to claim 1 wherein the at least one inlet includes an inlet configured to supply gas at a lower portion of the internal gas chamber.

7. The intermittent gas flow apparatus according to claim 1 wherein the at least one inlet includes an inlet configured to supply gas at an upper portion of the internal gas chamber.

8. The intermittent gas flow apparatus according to claim 1 wherein the at least one inlet includes an inlet configured to supply gas at a lower portion of the interior gas chamber, and an inlet configured to supply gas at an upper portion of the internal gas chamber.

9. The intermittent gas flow apparatus according to claim 1 further including a filter in the space between the wall of the tubular member and the auxiliary pipe.

10. The intermittent gas flow apparatus according to claim 1 wherein the internal gas chamber includes a side wall including an opening therein, and further including a filter in the opening in the side wall.

11. The intermittent gas flow apparatus according to claim 1 further including an insertion length adjuster adjusting an insertion length of the auxiliary pipe in the tubular member.

12. The intermittent gas flow apparatus according to claim 1 further comprising a gas entry preventer preventing gas from the at least one inlet from directly entering the lower end portion opening of the column pipe.

13. A membrane separation apparatus for filtering and separating liquid in a treatment tank by pumping the liquid through a filtration membrane submerged in the liquid in the treatment tank, the membrane separation apparatus comprising:
    a treatment tank;
    a filtration membrane in the treatment tank;
    an intermittent gas flow apparatus positioned in the treatment tank below the filtration membrane, the intermittent gas flow apparatus comprising:
        an internal gas chamber including an upper wall;
        at least one inlet for supplying gas to the internal gas chamber;
        a column pipe that extends above the upper wall of the internal gas chamber, the column pipe including a lower end portion including a lower end portion opening in the internal gas chamber, the column pipe linking the internal gas chamber to an external area, external to the internal gas chamber for fluid flow between the internal gas chamber and the external area;
        an auxiliary pipe including one end portion connected to the column pipe for fluid flow between the auxiliary pipe and the column pipe, and another end portion branched off from the column pipe, the another end portion including an opening located in the internal gas chamber at a position higher than the lower end portion opening of the column pipe by a predetermined height; and
        an auxiliary pipe external tubular member including a closed end, the auxiliary pipe external tubular member surrounding the another end portion of the auxiliary pipe with the closed end being positioned below the opening in the another end portion of the auxiliary pipe, and spaced from the another end portion by a predetermined distance permitting fluid flow into the space between a wall of the tubular member and a wall of the auxiliary pipe.

14. The membrane separation apparatus according to claim 13 wherein the filtration membrane comprise a plurality of filtration membranes.

15. The membrane separation apparatus according to claim 14 wherein the plurality of filtration membranes comprise bundles of hollow fiber membranes.

16. The membrane separation apparatus according to claim 15 wherein the intermittent gas flow apparatus is positioned directly below bundles of hollow fiber membranes.

17. The membrane separation apparatus according to claim 15 wherein the intermittent gas flow apparatus is offset with respect to bundles of hollow fiber membranes.

18. The membrane separation apparatus according to claim 15 wherein the intermittent gas flow apparatus is attached to the bundle of hollow fiber membranes.

19. The membrane separation apparatus according to claim 13 wherein the column pipe extends through the upper wall.

20. The membrane separation apparatus according to claim 15 further including an upwardly extending upper side wall above the upper wall.

21. The membrane separation apparatus according to claim 20 wherein the upper side wall extends around an entire periphery of the upper wall.

22. The membrane separation apparatus according to claim 21 further including an opening in the upper side wall.

23. The membrane separation apparatus according to claim 21 wherein the upper side wall is attached to the bundle of hollow fiber membranes.

24. The membrane separation apparatus according to claim 23 wherein the upper side wall and the bundle of hollow fiber membranes form an upper chamber.

25. The membrane separation apparatus according to claim 24 wherein the intermittent gas flow apparatus supports the bundle of hollow fiber membranes.

26. The membrane separation apparatus according to claim 21 wherein
    the upper side wall is attached to the bundle of hollow fiber membranes so that the intermittent gas flow apparatus supports the bundle of hollow fiber membranes; the upper side wall and the bundle of hollow fiber membranes form an upper chamber; the upper wall forms a partition between the upper chamber and the internal gas chamber; the column pipe extends through the upper wall linking the internal gas chamber and the upper chamber; the auxiliary pipe is linked to the column pipe in the upper chamber; and the bundle of hollow fiber membranes includes a portion including openings for aeration positioned at predetermined positions to permit gas passage around the hollow fiber membranes.

27. The membrane separation apparatus according to claim 13 further including an aeration pipe adapted to continuously supply gas to the internal gas chamber.

28. A method of supplying intermittent flow of air for cleaning of a filtration membrane submerged in liquid in a treatment tank, comprising:
    positioning an intermittent gas flow apparatus in the treatment tank below the filtration membrane, the intermittent gas flow apparatus comprising:
        an internal gas chamber including an upper wall;
        at least one inlet for supplying gas to the internal gas chamber;
        a column pipe that extends above the upper wall of the internal gas chamber, the column pipe including a lower end portion including a lower end portion opening in the internal gas chamber, the column pipe linking the internal gas chamber to an external area, external to the internal gas chamber for fluid flow between the internal gas chamber and the external area;

an auxiliary pipe including one end portion connected to the column pipe for fluid flow between the auxiliary pipe and the column pipe, and another end portion branched off from the column pipe, the another end portion including an opening located in the internal gas chamber at a position higher than the lower end portion opening of the column pipe by a predetermined height; and an auxiliary pipe external tubular member including a closed end, the auxiliary pipe external tubular member surrounding the another end portion of the auxiliary pipe with the closed end being positioned below the opening in the another end portion of the auxiliary pipe, and spaced from the another end portion by a predetermined distance permitting fluid flow into the space between a wall of the tubular member and a wall of the auxiliary pipe; and continuously flowing air through the intermittent gas flow apparatus to provide intermittent flow of air to the filtration membrane from the intermittent gas flow apparatus.

29. The method according to claim 28 wherein the filtration membrane comprises a bundle of hollow fiber membranes.

* * * * *